(12) United States Patent
Chayat (10) Patent No.: US 9,204,445 B2
(45) Date of Patent: Dec. 1, 2015

(54) METHOD AND SYSTEM FOR ALLOCATING WIRELESS TRANSMISSION RESOURCES

(75) Inventor: Naftali Chayat, Kfar Saba (IL)

(73) Assignee: ALVARION LTD., Tel Aviv (IL)

( * ) Notice: Subject to any disclaimer, the term of this patent is extended or adjusted under 35 U.S.C. 154(b) by 1128 days.

(21) Appl. No.: 12/565,045

(22) Filed: Sep. 23, 2009

(65) Prior Publication Data

US 2010/0075687 A1    Mar. 25, 2010

(30) Foreign Application Priority Data

Sep. 25, 2008 (IL) .......................................... 194364

(51) Int. Cl.
  H04W 72/00     (2009.01)
  H04W 72/04     (2009.01)
(52) U.S. Cl.
  CPC .................................. *H04W 72/046* (2013.01)
(58) Field of Classification Search
  CPC ..................................................... H04W 72/00
  See application file for complete search history.

(56) References Cited

U.S. PATENT DOCUMENTS

| | | | | |
|---|---|---|---|---|
| 5,974,323 | A * | 10/1999 | Doner | 455/447 |
| 6,078,814 | A * | 6/2000 | Jeffries et al. | 455/447 |
| 6,473,616 | B1 | 10/2002 | Sydor | |
| 6,542,746 | B1 * | 4/2003 | Dean | 455/447 |
| 6,748,218 | B1 | 6/2004 | Johnson et al. | |
| 6,804,521 | B2 * | 10/2004 | Tong et al. | 455/450 |
| 7,962,145 | B2 * | 6/2011 | Gale et al. | 455/450 |
| 8,280,444 | B1 * | 10/2012 | Shen et al. | 455/562.1 |
| 2002/0028677 | A1 * | 3/2002 | Johnson et al. | 455/446 |
| 2002/0072373 | A1 * | 6/2002 | Muramoto et al. | 455/446 |
| 2002/0115474 | A1 * | 8/2002 | Yoshino et al. | 455/562 |
| 2003/0008654 | A9 * | 1/2003 | Senarath et al. | 455/450 |
| 2003/0022694 | A1 | 1/2003 | Olsen et al. | |
| 2006/0135169 | A1 * | 6/2006 | Sampath et al. | 455/447 |
| 2006/0148484 | A1 * | 7/2006 | Zhang et al. | 455/450 |
| 2006/0258362 | A1 * | 11/2006 | Jin et al. | 455/450 |
| 2007/0021151 | A1 * | 1/2007 | Mori et al. | 455/562.1 |
| 2008/0167077 | A1 * | 7/2008 | Raffaelli et al. | 455/562.1 |
| 2011/0038308 | A1 * | 2/2011 | Song et al. | 370/328 |

* cited by examiner

*Primary Examiner* — Vladimir Magloire
*Assistant Examiner* — Frank Donado
(74) *Attorney, Agent, or Firm* — D. Kligler I.P. Services Ltd.

(57) ABSTRACT

A wireless communications system is described which comprises a plurality of base stations, each comprises at least one beam generating means for generating narrow spatial beams for communicating with respective subscriber devices located along a direction to which the respective narrow beam is currently directed. The system's transmission resources are allocated so that a substantial part of the resources allocated to each of the beam generating means is different from a substantial part of transmission resources allocated to any of the angularly adjacent beam generating means at the respective base station and are different from the substantial part of the resources allocated to beam generating means associated with adjacent base stations and directed towards geographical areas located in a proximity to the geographical area towards which the respective narrow beam is directed.

21 Claims, 13 Drawing Sheets

METHOD AND SYSTEM FOR ALLOCATING WIRELESS TRANSMISSION RESOURCES

FIELD OF THE INVENTION

The present invention relates generally to digital wireless communications systems and methods of using them, and in particular, to methods for implementing a network that comprises high capacity base stations having multiple beams per base station.

BACKGROUND OF THE INVENTION

The business case of a cellular operator can be estimated by comparing the revenue received per user to the expense incurred per user. The infrastructure expense incurred per user can be approximated by base station cost (including the site and the backhauling) divided by the number of users served. Given that the base station cost will remain high (mainly due to site acquisition costs), it is understandable why there is an ongoing strive to serve as many users as possible by each base station.

Next generations of cellular communications will require several Mbits/sec per active user and at least hundreds of Mbits/sec per base station. Unfortunately, the need to provide very large capacity is not always matched by the availability of very high bandwidth. As a result, one would need to seek additional capacity multipliers, such as high spatial reuse factors to meet the required capacity. Assuming that channel bandwidths of 10-40 MHz and typical spectral efficiencies, spatial reuse factors of 10-30 will be required.

Typical base stations have spatial reuse factors of 3 due to sectorization. MIMO is a potential source of higher reuse, however in practice it is limited to an additional factor of 2 (due to the number of antennas in subscriber devices) and even this benefit is achieved only at high signal-to-interference ratios which are seldom achieved in cellular environment. Therefore, it would be advantageous to substantially increase the reuse factor by serving more users in parallel as proposed by the present invention.

Several technologies are available to increase the spatial reuse by generating multiple parallel data streams. The most obvious one is using multiple antennas with fixed narrow beams (or multibeam antennas implementing multiple beams with a common antenna aperture), each attached to its own radio modem. A more complicated solution is to form narrow beams by using phased array or digital beamforming techniques. At the extreme end, SDMA (Spatial Division Multiple Access) techniques create dynamically a set of beams according to the set of users being served at a given moment.

The techniques using fixed beams enjoy the simplicity of independent radio modem (including traffic scheduling) in each beam. In contrast, SDMA involves complicated logic for scheduling multiple transmissions to multiple users, as well as solving complicated multiple-user beamforming equations for each transmission burst.

The SDMA and subsectorization dimensions are similar in the sense that they enable obtaining higher throughput by serving multiple users at the same time. SDMA allows higher flexibility in selecting the sets of users to be served simultaneously, and lower mutual interference by directing nulls to other users when transmitting to each of the users that belong to such a selected set. The penalty paid is higher processing requirements for true SDMA (proportional to the cube of the number of simultaneous beams), as well as higher scheduling complexity.

The use of multiple transmit streams in parallel requires managing the interference among these streams. The interference management in cellular/sectorized deployment is achieved by planning the reuse scheme. Reuse planning is a well developed art for usual omnidirectional or 3-sector deployment. Reuse-3 and reuse-1 approaches are commonplace. Newer approaches such as using both reuse-3 (for edge-of-cell) and reuse-1 (for closer users) at the same cell, as well as Fractional Frequency Reuse (FFR), are being introduced. However, planning for deep subsectorization introduces new challenges due to the complex geometry of the interference environment.

Therefore, an adequate solution to the above described obstacles in implementing networks with high capacity base stations is required.

Several attempts were made to use sectorization with multiple narrow beams for access.

U.S. Pat. No. 6,748,218 assigned to REMEC Inc., discloses the use of multibeam antennas to achieve high spectral reuse within each base station. The publication is mainly concerned with a deployment that uses directional antennas at the subscriber side, and is less concerned with planning for the edge-of-cell, where the subscriber's directionality allows him to look at the desired base station while ignoring the base station at its back. This fact allowed the inventors to focus on the reuse among sectors within a base station, and for this two resources (frequency or polarization) in an A-B-A-B scheme would suffice. When concerned with interference among base stations, the focus is on sectors of two adjacent cells that are similarly oriented approximately along a bore axis of the two cells.

The MILTON project of the Canadian Research Centre ("CRC") described the use of 24 beams with 5 GHz band transceivers for high capacity access. In their various publications, including U.S. Pat. No. 6,473,616, separate antenna was used for each beam. The reuse scheme demonstrated by CRC is concerned with a regular ABCDABCD scheme. The alignment of the antennas between cells was not chosen specifically, so illumination of cell edge regions by same channel does occur. Just as with U.S. Pat. No. 6,748,218, users are assumed to be directional and therefore illumination of a user by same channel from two different directions still works well.

Neither of the publications referred to above, solves the problem of interference management at edge of cell when the users use omnidirectional antennas as is common in mobile cellular systems, as done by the present invention.

SUMMARY OF THE INVENTION

It is therefore an object of the present invention to provide a novel method to allow increasing the capacity of a base station that utilizes a large number of narrow beams to communicate with subscriber devices.

It is another object of the present invention to provide a method to allow designing an improved configuration for a system having complicated geometry coverage.

Other objects of the invention will be described hereinafter.

According to a first embodiment of the invention, there is provided a wireless communications system comprising a plurality of base stations and a plurality of subscriber devices, each base station comprising at least one beam generating means operative to generate a plurality of narrow spatial beams for communicating with respective subscriber devices out of the plurality of subscriber devices, wherein each of the beam generating means is operative to generate at least one narrow beam for transmitting/receiving communications to/from subscriber devices located along a direction to which the at least one narrow beam is currently directed, wherein the system is provided with a plurality of transmission resources for conveying communications via the plurality of beam generating means, and wherein:

transmission resources selected out of the plurality of transmission resources are allocated for conveying communications via each of the plurality of beam generating means so that a substantial part of transmission resources allocated to each of the beam generating means are different from a substantial part of the transmission resources allocated for conveying communications via any of angularly adjacent beam generating means at the same base station and are different from the substantial part of transmission resources allocated for conveying communications via beam generating means associated with adjacent base stations and directed towards geographical areas located in a proximity to the geographical area towards which the respective narrow beam is directed.

According to a preferred embodiment of the invention, one transmission resource is allocated to each of the beam generating means. In addition or in the alternative, additional resources may be used within each beam, for example resources transmitted at lower power for serving users closer to the base station.

In accordance with another preferred embodiment, the transmission resource is a member of the group consisting of:
a) a frequency channel,
b) a set of frequency channels,
c) a set of frequency subchannels,
d) a time slot,
e) a set of time slots, and
f) any time-frequency slot combination.

As will be appreciated by those skilled in the art, additional domains of partitioning the resources that are known in the art per se, such as polarization or CDMA spreading codes, may be used, and should be understood as being encompassed by the present invention.

According to still another preferred embodiment of the present invention, communications conveyed via each of the beam generating means are transmitted by a member of the group consisting of:
a) an antenna;
b) a multibeam antenna;
c) a multielement phased array antenna; and
d) a digital beamforming antenna.

By yet another preferred embodiment of the present invention, the transmission resources allocated for conveying communications via at least one of the beam generating means are timeslots and wherein the system comprising at least one radio modem capable of serving more than one beam generating means by way of alternating in time.

Preferably, the at least one radio modem (e.g. access unit) is capable of serving more than one beam generating means by selecting one of multiple ports of the respective beam generating means.

In the alternative, the at least one radio modem is capable of serving more than one beam generating means by changing the weights in a multi-element phased array.

By still another preferred embodiment, sets of multiple beams are produced by a multi-element antenna array and multiple transmission resources are assigned to these antennas for conveying communications by using a corresponding set of weights for each transmission resource.

In accordance with yet another preferred embodiment of the invention, the at least one beam generating means on the reception of the uplink is defined by a maximal ratio combining process and wherein the plurality of subscriber devices are classified according to their respective maximal ratio combining coefficients. Preferably, the at least one beam generating means on the downlink transmission is defined by beamforming with coefficients derived from the uplink receive maximal ratio combining process.

According to another aspect of the invention, there is provided a method for allocating transmission resources in a wireless communications network comprising at least one base station and a first plurality of subscriber terminals, wherein the method comprises the steps of:

(a) dividing an area covered by the wireless communications network into a plurality of auxiliary cells;

(b) assigning at least one transmission resource to each of the auxiliary cells according to a pre-defined reuse scheme;

(c) dividing the plurality of auxiliary cells into groups according to their proximity to the at least one base station, thereby demarcating areas each comprising a group of auxiliary cells surrounding a respective at least one base station, and thereby obtaining for each of the at least one base station a respective communication cell;

(d) designating a radio beam in a direction determined by the location of each of auxiliary cells located adjacent to the edge of a respective communication cell; and (e) allocating at least one transmission resource to each designated radio beam according to the transmission resource assigned to the corresponding auxiliary cell in step (b).

Preferably, the step of dividing the area comprises dividing the area covered by the wireless communications network into a plurality of auxiliary cells each having a substantially hexagonal shape.

In the alternative, the step of dividing the area comprises dividing the area covered by the wireless communications network into a plurality of auxiliary cells each having a substantially rectangular shape.

BRIEF DESCRIPTION OF THE DRAWINGS

FIGS. 1A to 1C illustrate prior art configurations of cellular reuse planning, wherein:

FIGS. 2A to 2C illustrate a procedure for planning frequency reuse with 6-sector base station and 3 resources, wherein:

FIGS. 3A and 3B illustrate a procedure for planning for frequency reuse with 9-sector base station and 3 resources, wherein:

FIGS. 5A to 5D illustrate a procedure for planning frequency reuse for a multisector base station and 4 resources, wherein:

FIGS. 6A to 6C illustrate different ways of partitioning the time-frequency pool of transmission resources into transmission resource which are in the sequel assigned to the antenna beams, wherein:

FIGS. 7A to 7C illustrate different ways of utilizing a single radio modem in conjunction with a reconfigurable antenna to serve multiple antenna beams, wherein:

DETAILED DESCRIPTION OF THE INVENTION

A better understanding of the present invention may be obtained when the following non-limiting detailed description is considered in conjunction with the accompanying figures.

Figure 1A:
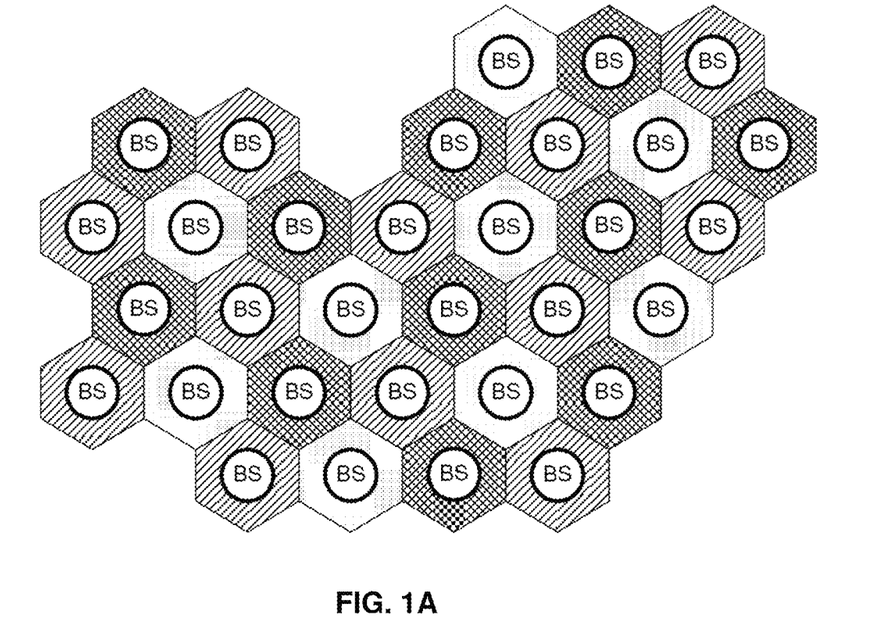
FIG. 1A—presents an array of hexagonal cells with omni-directional base stations and assigning resources according to reuse-3 scheme.
Figure 1B:
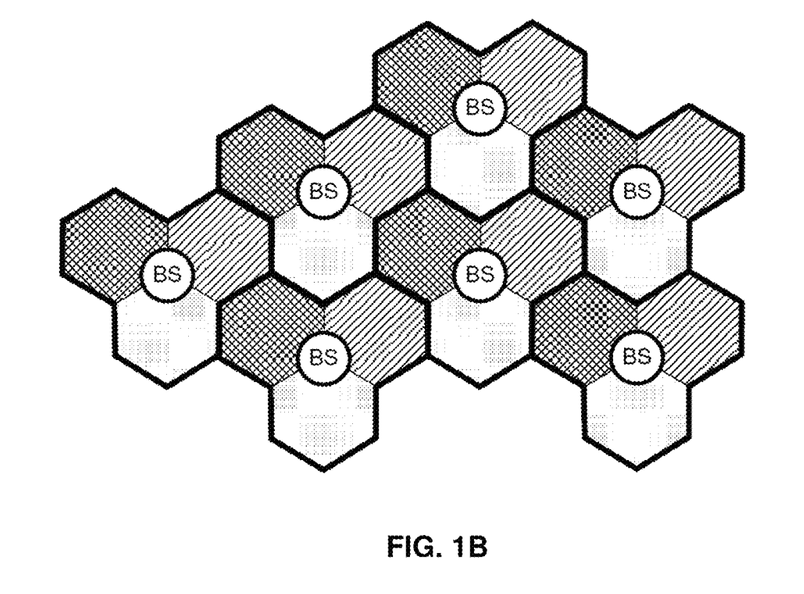
FIG. 1B—presents a 3-sector base station with sector orientation forming clover-leaf cell shape and assigning resources according to reuse-3 scheme.
Figure 1C:
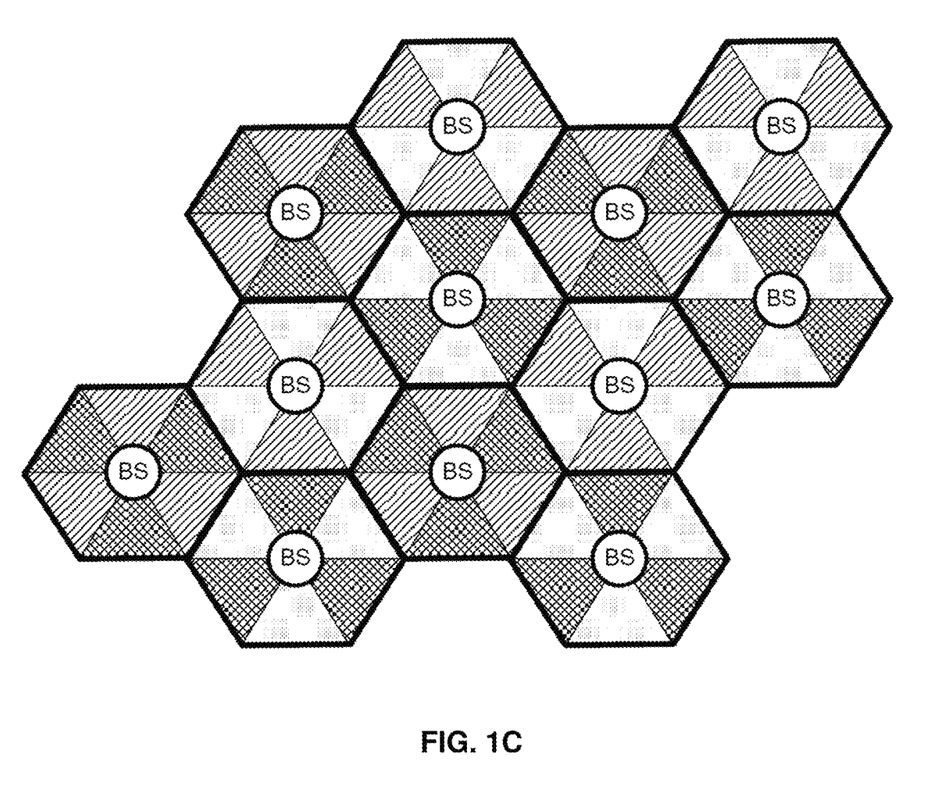
FIG. 1C—presents cells with 6 sectors in each base station, with antennas directed towards neighbor base stations.

In current art it is common to use either omnidirectional cells or 3-sector cells. FIG. 1A illustrates omnidirectional cells with reuse-3 resource assignment. In this case the carrier-to-interference ratio is controlled by virtue of the ratio of the distance between users in a cell, the desired base station and the nearest base station using the same transmission resource. The reuse-3 coloring assures that no two adjacent cells use the same transmission resource. Same principle is applied in the 3-sector scheme shown in FIG. 1B, where no two adjacent sectors use the same transmission resource, and also users located at the edge of a cell illuminated by sectors from more than one base station are subjected to different transmission resources associated with sectors of different base stations. The prior art extension to 6 sectors, shown in FIG. 1C, however, does not ensure the low-interference property to all edge-of-cell users. The users in the regions where three cells meet are subjected, for each transmission resource, to interference at a power equal to the desired signal arriving from a neighbor base station. As a result, the deployment of FIG. 1C is not well suited as a deployment for serving users by using omnidirectional antennas.

Let us now first consider how a methodology for implementing a reuse scheme when deploying base stations associated with large number of sectors, may be carried out according to a preferred embodiment of the present invention. The following description refers mainly to cells being in a hexagonal shape, but as will be appreciated by those skilled in the art this shape is only a typical example and it is not meant in any way to imply that the present invention is restricted to this shape or to any particular shape.

Regular deployment design strategies start with dividing the area into hexagonal cells and coloring them according to a chosen reuse factor. In the case of omnidirectional cells, one could place a base station at the center of each hexagon, and then the isolation would arise from the ratio existing between the distance extending from the edge to the center of cell, and to the center of same-colored cell, as illustrated in FIG. 1A.

In the case of sectorized deployment with 3 sectors per base station, we resort to the notion of edge-illuminated cell. By putting the base station at corners that are common to 3 hexagons, we may carry out the illumination with 3 directional antennas. By using reuse-coloring and 3 sector base stations, we immediately obtain the familiar "clover leaf pattern", as shown in FIG. 1B.

Figure 2A:
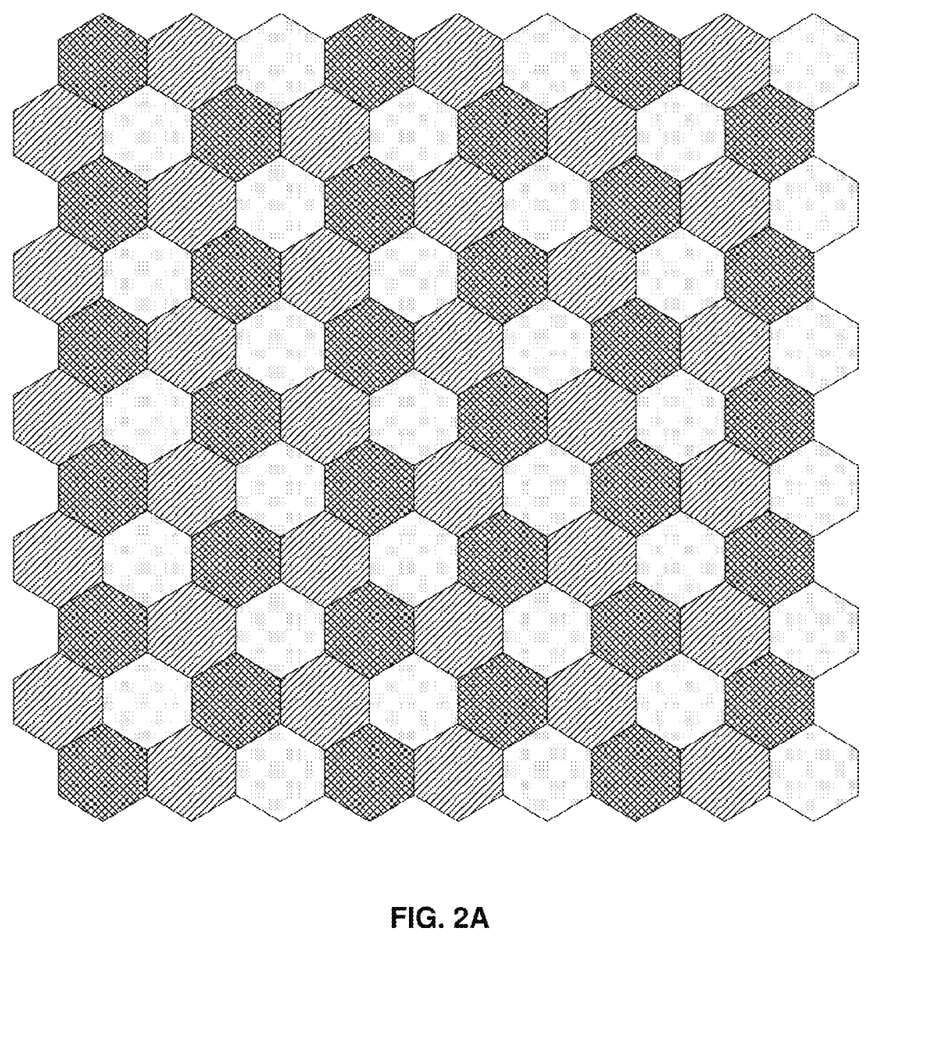
FIG. 2A—presents partitioning of the area into an array of hexagonal auxiliary cells and assigning resources according to reuse-3 scheme.
Figure 2B:
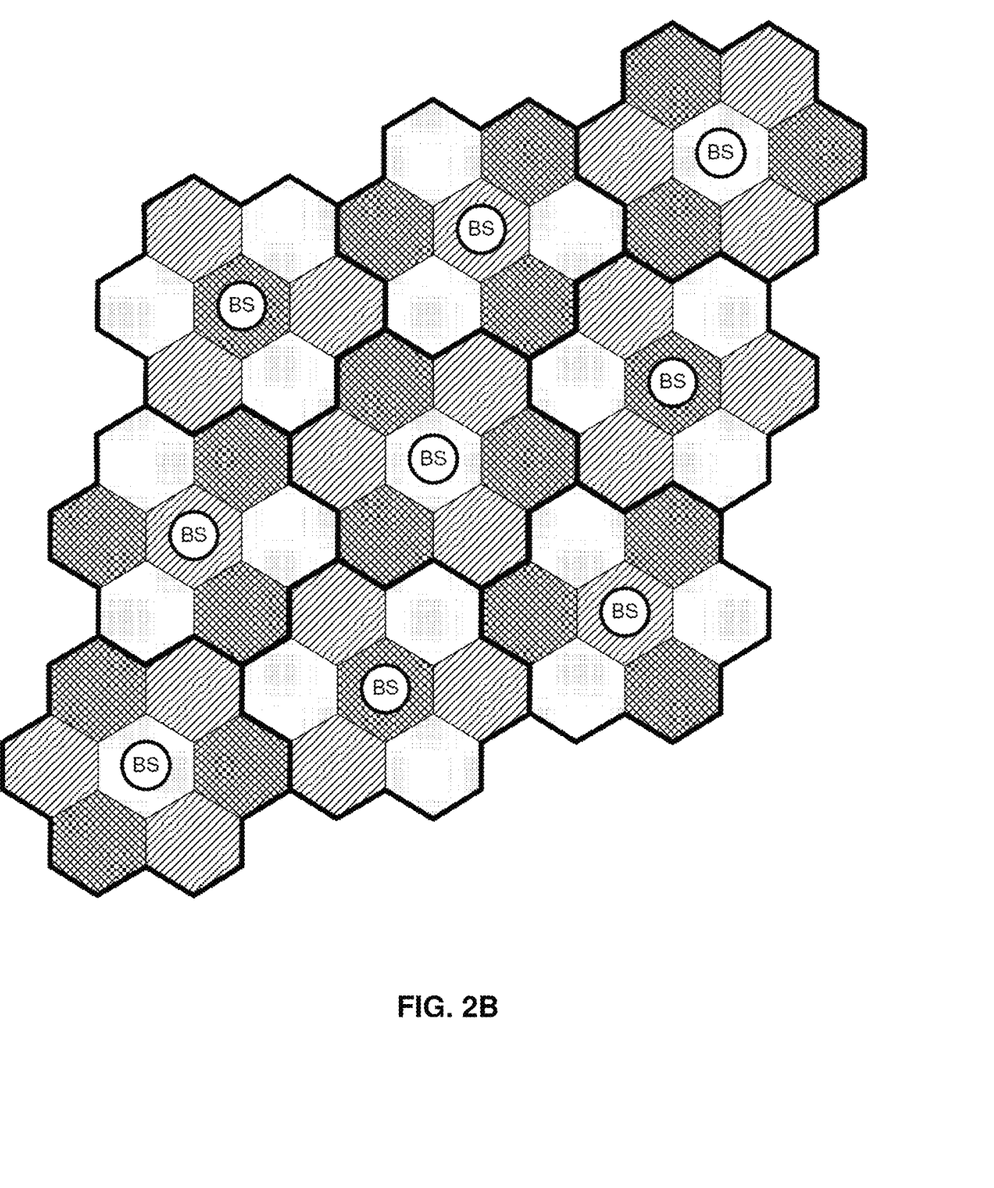
FIG. 2B—presents partitioning the auxiliary cells into cells which are clusters of 7 auxiliary cells and placing a base station in the center of each cell.
Figure 2C:
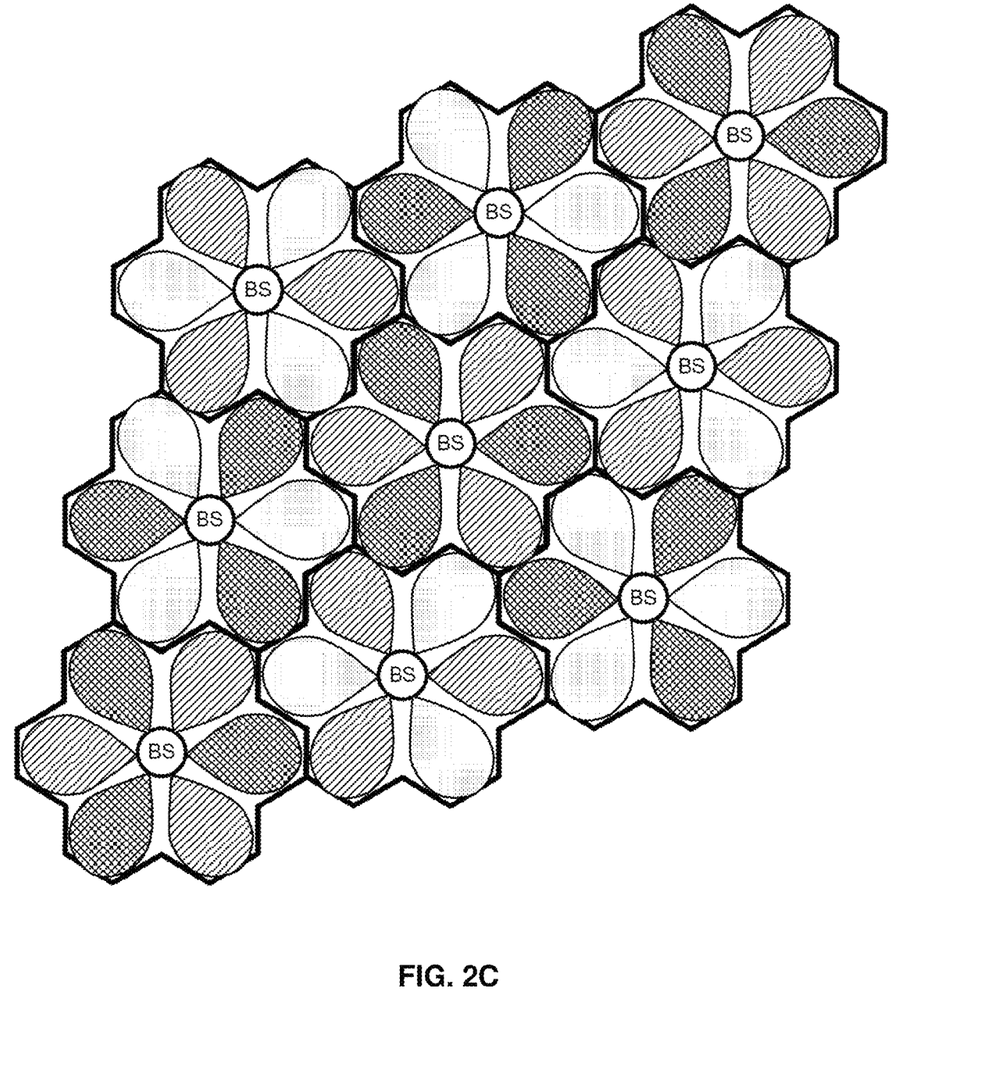
FIG. 2C—presents the 6 antenna beams pointing at the 6 edge-of-cell auxiliary cells and assignment of resources to the antenna beams according to the resources assigned to the corresponding auxiliary cells.

The method encompassed by the present invention provides a procedure that enables for low-interference deployment planning where the number of sectors exceeds three. In one embodiment, the planning starts with covering the area with auxiliary cells, such as hexagonal auxiliary cells, as presented in FIG. 2A. At the next step, the auxiliary cells are grouped into clusters and a base station is placed at the center of each cluster. This step is illustrated in FIG. 2B, in which groups of 7 cells are created according to a regular pattern arising from reuse-7 coverage, and a base station is placed at the center of each cluster. The area covered by each cluster of 7 auxiliary cells becomes now a cell (i.e. a communication cell) serviceable by a base station. In the last step, a narrow beam antenna is directed towards each of the six auxiliary cells at the edge of the cell, and assigns a transmission resource to the beam according to the assignment of transmission resources to the corresponding auxiliary cells. This step is illustrated in FIG. 2C, in which the six beams illuminate the directions of the six auxiliary cells within each 7-auxiliary-cell cluster.

It is worth noting that the outcome of the procedure outlined above differs from the prior art solutions even for the relatively simple case of six sectors. When following the prior art solutions, the six sectors are directed at the adjacent base station, while according to current invention the beam directions would preferably be offset from the direction towards the adjacent base station by approximately 20 degrees. As a result, areas located at the boundary between cells are never illuminated by the same transmission resources, even in locations where three cells meet.

The resources' assignment scheme ensures that adjacent beams within a cell never use the same transmission resource. This happens because the same resource is never assigned to adjacent auxiliary cells located along the periphery of the cell. Moreover, the scheme ensures that the sectors from neighboring cells illuminating a user at the edge of cell do not use same resource as the desired sector, by virtue of the fact that the resource assignment to the desired and opposing sector arise from resources assigned to adjacent auxiliary cells which cannot be same as explained above.

Another byproduct of interest of the present invention is that resources' assignment is generated automatically for the cases in which the assignment is not the same in all cells. In the example of six sectors which is exemplified in FIGS. 2A to 2C, three different patterns for resources' assignment within a cell are presented. This arises from the fact that the greatest common divisor ("GCD") of 7 (cluster size) and 3 (reuse factor) is 1.

Figure 3A:
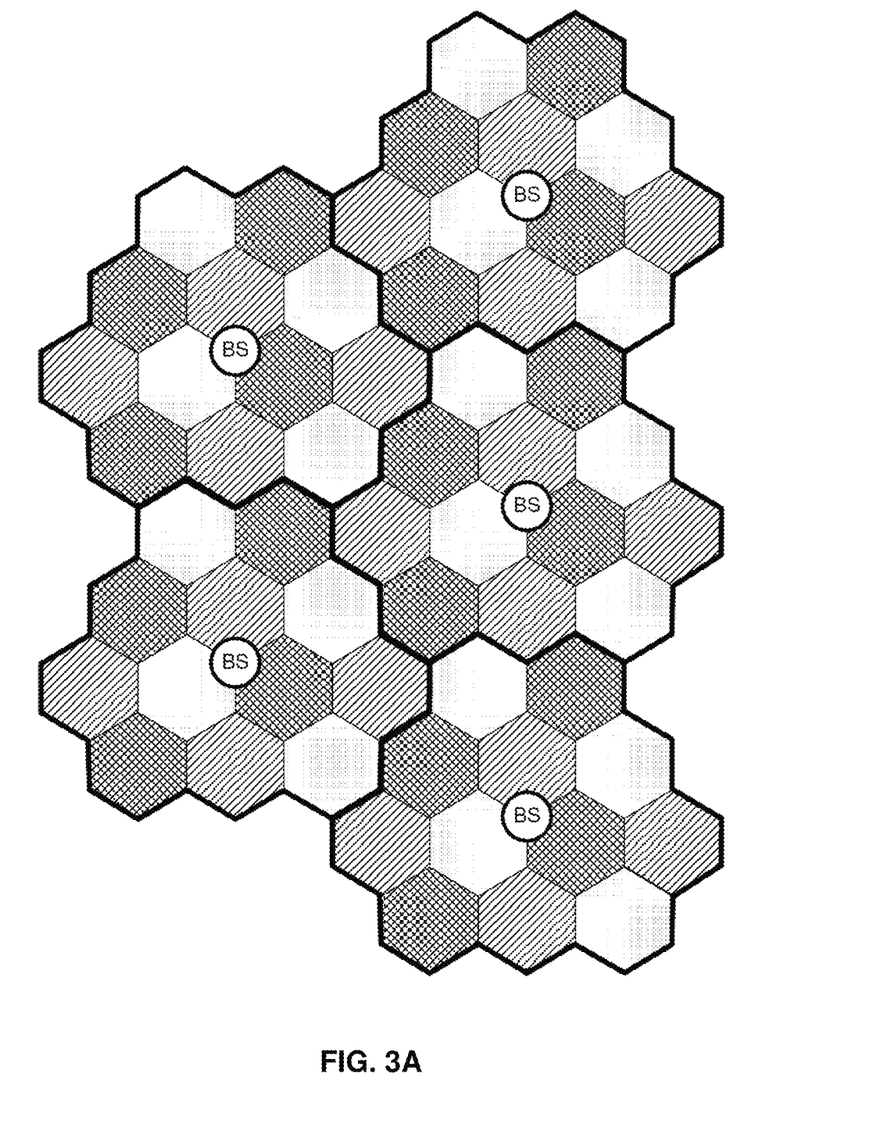
FIG. 3A—presents partitioning the auxiliary cells into cells which are clusters of 12 auxiliary cells and placing a base station in the center of each cell.
Figure 3B:
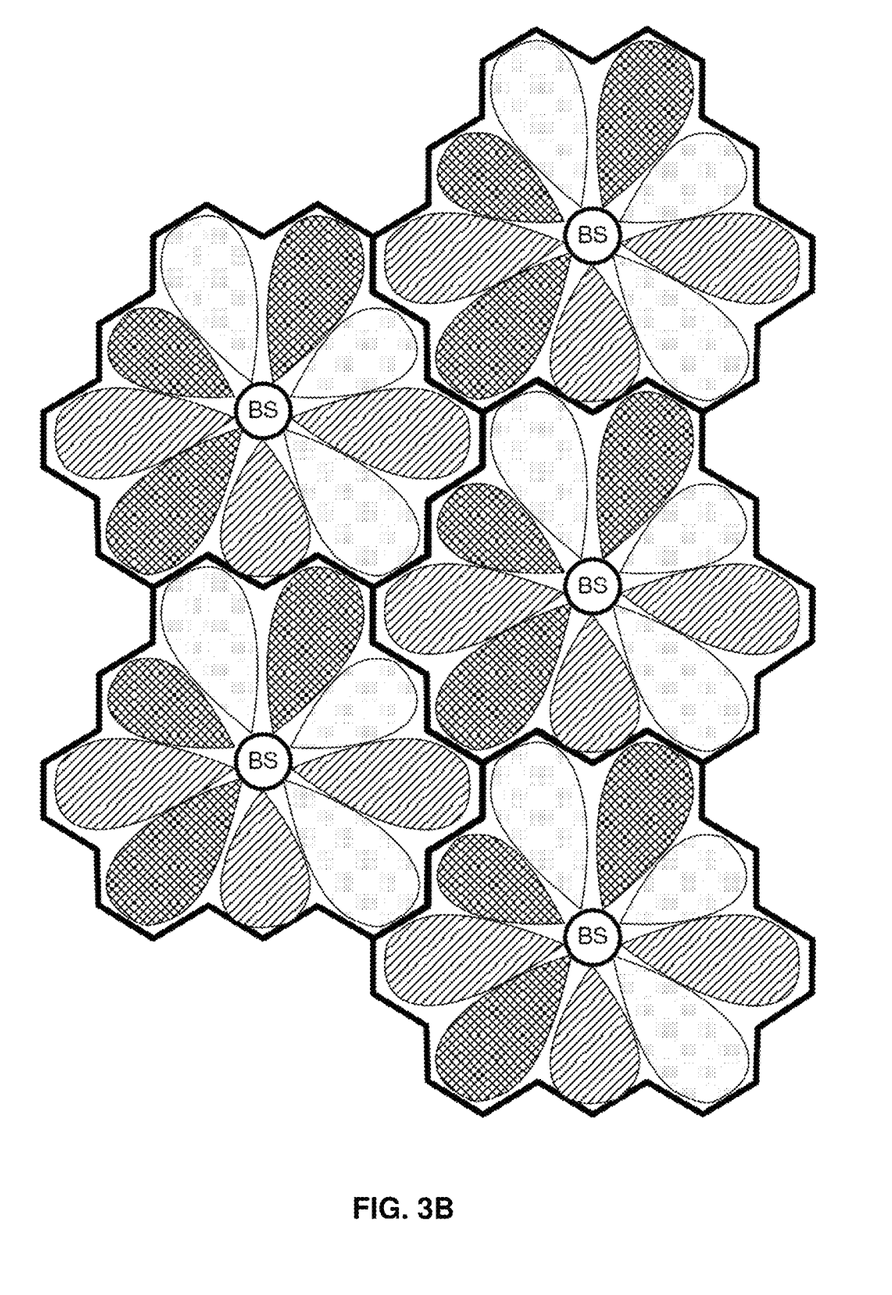
FIG. 3B—presents the 9 antenna beams pointing at the 9 edge-of-cell auxiliary cells and assignment of resources to the antenna beams according to the resources assigned to the corresponding auxiliary cells.
Figure 4:
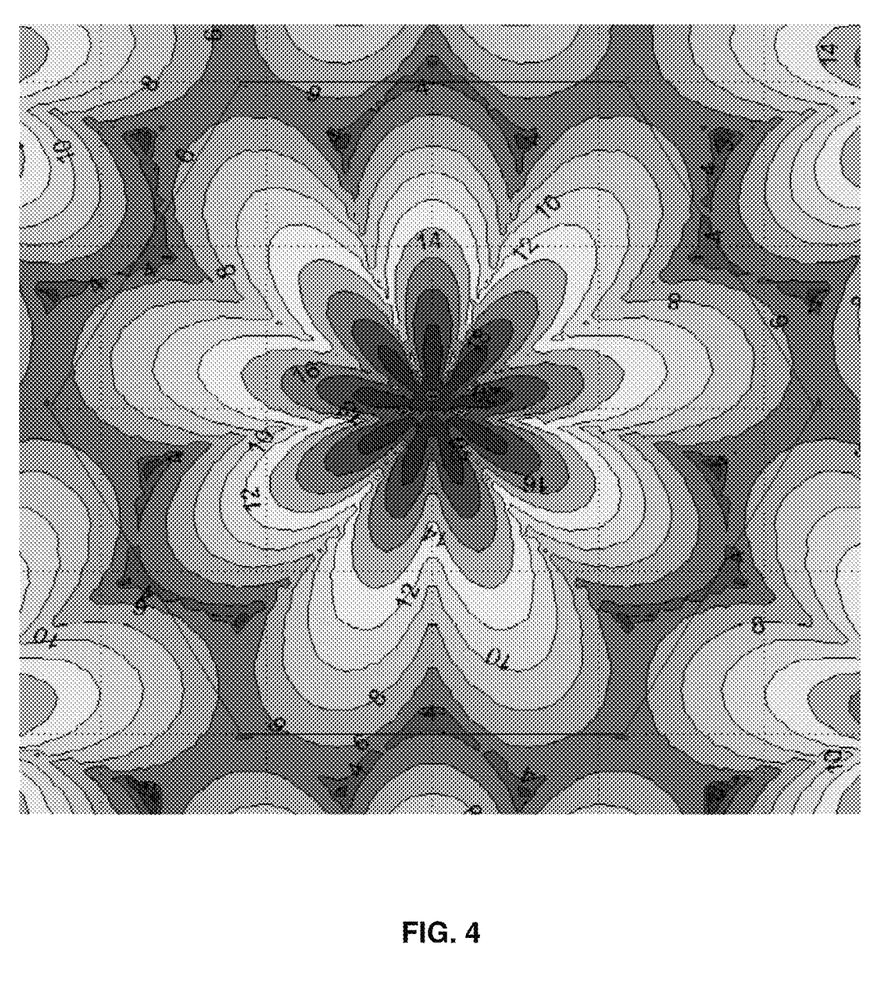
FIG. 4—illustrates a map of Carrier-to-Interference Ratio obtained by users within the area with the 9-sector deployment planned according to an embodiment of the present invention.

Another example of applying the present invention to design of a 9-sector coverage pattern is demonstrated in FIGS. 3A and 3B. At the first step we divide the array of auxiliary cells (same as in FIG. 2A) into clusters of 12 auxiliary cells, as shown in FIG. 3A. At the second step, we assign 9 sector antenna beams to illuminate the 9 peripheral auxiliary cells. Interestingly, the order of resources in the sector does not follow the intuitive ABCABCABC order, but rather a more intricate one ABCBCACAB. Another feature of this case worth noticing is that all the cells have the same resource assignment order, because 3 (reuse factor) divides 12 (cluster size). Although the distance of the peripheral cells vary slightly and the directions to the 9 cells are not equally spaced, for all practical purposes equal spacing of 40 degrees between sectors and equal transmit power would provide near-optimal performance. FIG. 4 shows C/I distribution over area with the proposed deployment method, when 30-degree beamwidth antennas were assumed and received power decaying as a distance to the power of –3. FIG. 4 illustrates that even at the edge of the cell the C/I typically exceeds +4 dB.

The case of 6 sectors shown in FIG. 2 may be generalized easily to 12, 18, 24 etc. beams by adding additional peripheral layers of auxiliary cells in each cluster. Similarly, the 9 sector case shown in FIG. 3 may be generalized to 15, 21 etc. beams by adding additional layers of auxiliary cells in each cluster.

Notably, the regular reuse-3 clover leaf pattern is a special case outcome of the design procedure outlined above when applied to clusters of three auxiliary cells.

Figure 5A:
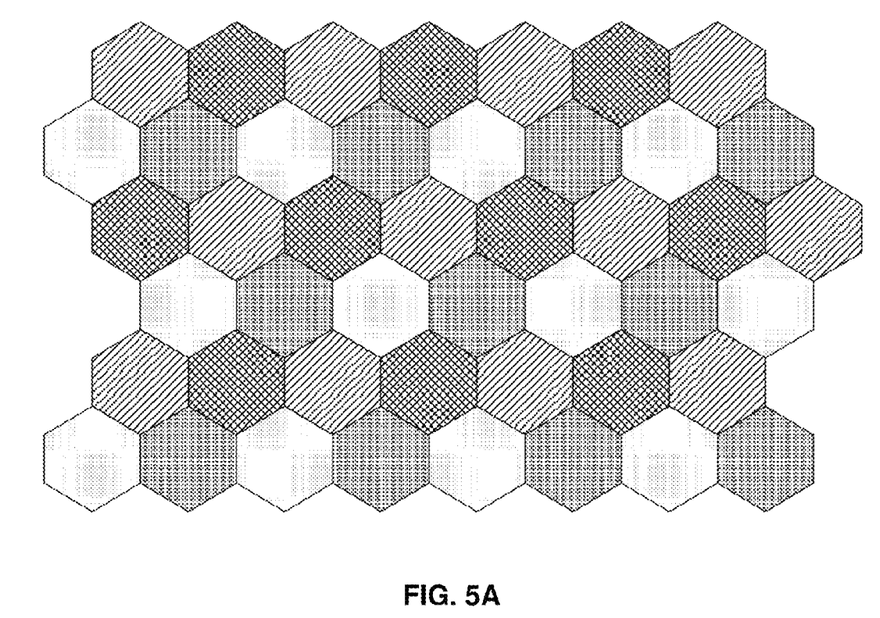
FIG. 5A—presents partitioning of the area into an array of hexagonal auxiliary cells and assigning resources according to reuse-4 scheme.
Figure 5B:
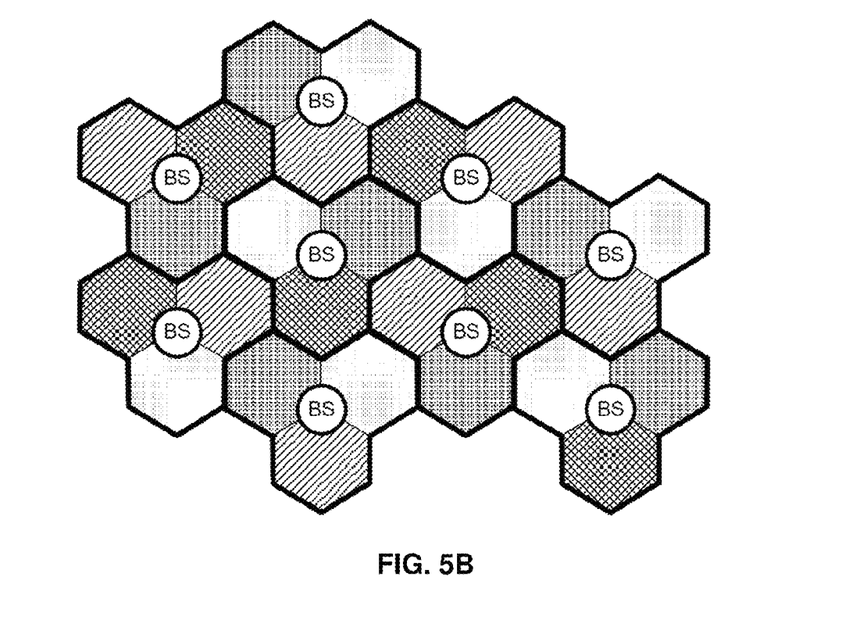
FIG. 5B—presents partitioning the auxiliary cells into cells which are clusters of 3 auxiliary cells generating a 3-sector reuse-4 deployment.
Figure 5C:
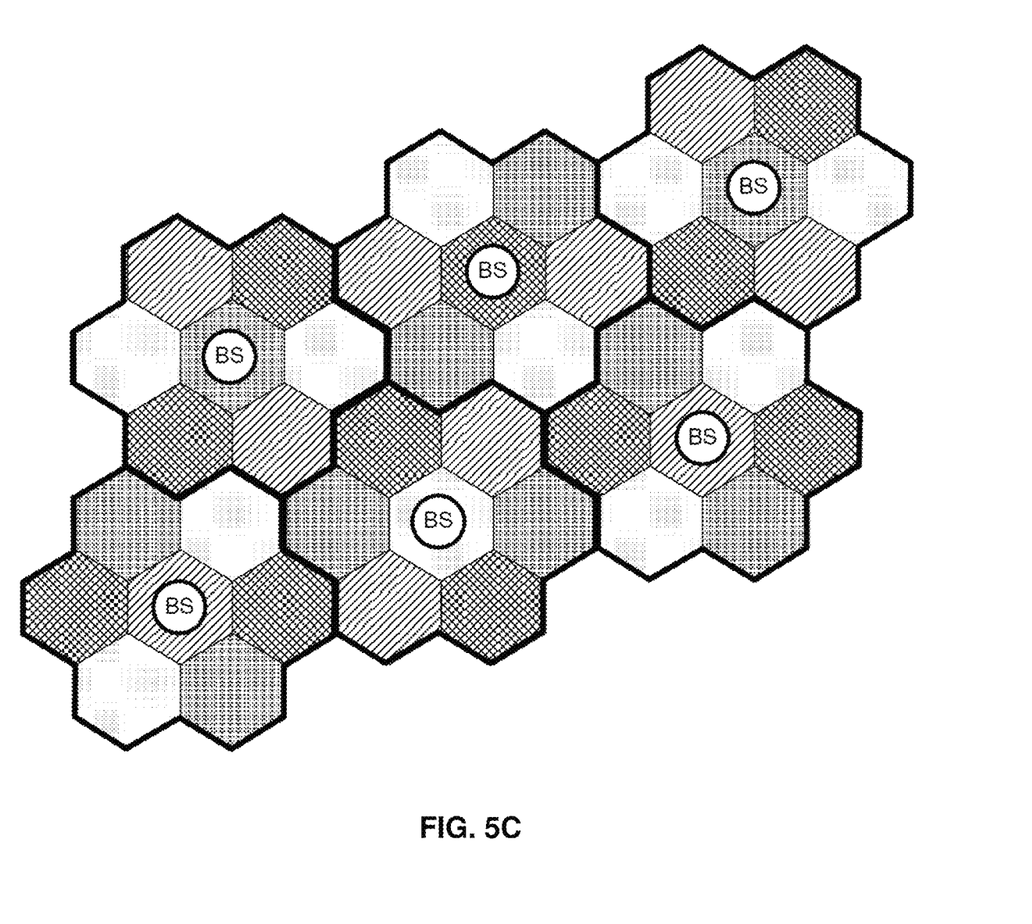
FIG. 5C—presents partitioning the auxiliary cells into cells which are clusters of 7 auxiliary cells generating a 6-sector reuse-4 deployment.
Figure 5D:
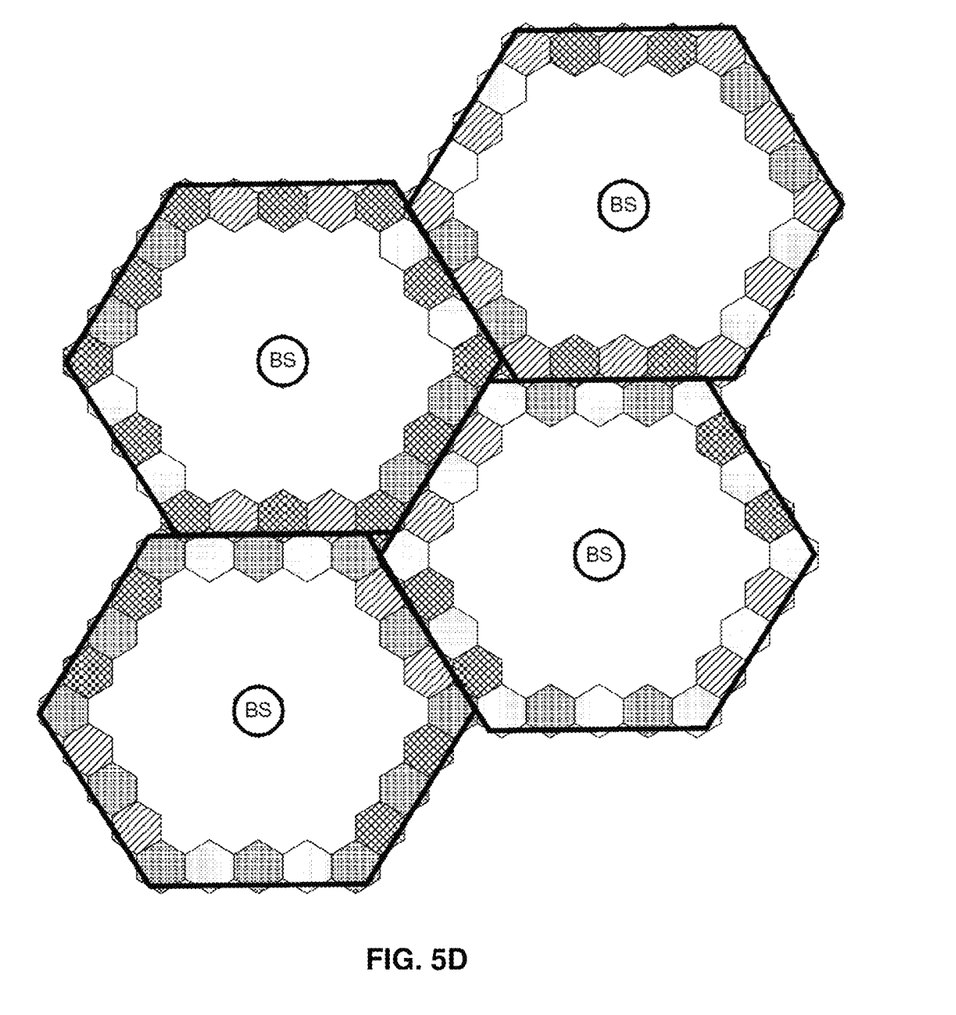
FIG. 5D—presents partitioning the auxiliary cells into cells which are clusters of 61 auxiliary cells generating a 24-sector reuse-4 deployment.

The design procedure according to the present invention is obviously not limited to reuse-3 coloring of the auxiliary cell canvas. FIGS. 5A to 5D present a case of reuse-4 coloring and several derivative cellular planning designs. FIG. 5A presents the starting reuse-4 canvas. FIG. 5B presents the regular 3-sector clover-leaf sector arrangement, however here unorthodoxly coupled with reuse-4 resource planning. Although for omnidirectional users it provides little benefit over reuse-3, it does provide a substantial benefit for subscribers with directional antennas. Similar result holds for 6-sector deployment shown in FIG. 5C and 24-sector deployment shown in FIG. 5D. When comparing the outcome of the process of the present invention and the example of 24 sector resource assignment disclosed in U.S. Pat. No. 6,748,218 FIG. 9, it may be seen that the example of U.S. Pat. No. 6,748,218 uses 8 resources to achieve the goal that radiation transmitted in the two cells at essentially the same direction and approximately along the bore axis, uses different channels. In the design procedure according to the present invention, the same goal is achieved with just 4 resources—a 100% improvement when considering the spectral efficiency.

Duplexing

The description above focused primarily on the interference occurring between beams for downlink transmissions. Same considerations, mutatis mutandis are applicable for uplink transmissions in duplex communications, therefore the cellular planning method of the present invention applies to downlink, uplink and bidirectional communications.

Moreover, same considerations equally apply to Frequency Division Duplex as well as Time Division Duplex bidirectional communications.

Communication Resources

Figure 6A:
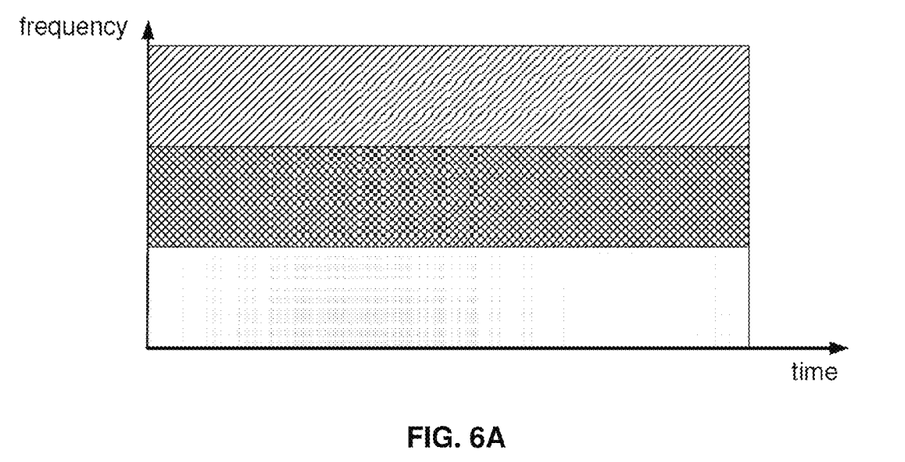
FIG. 6A—demonstrates designating frequency channels as the transmission resources.
Figure 6B:
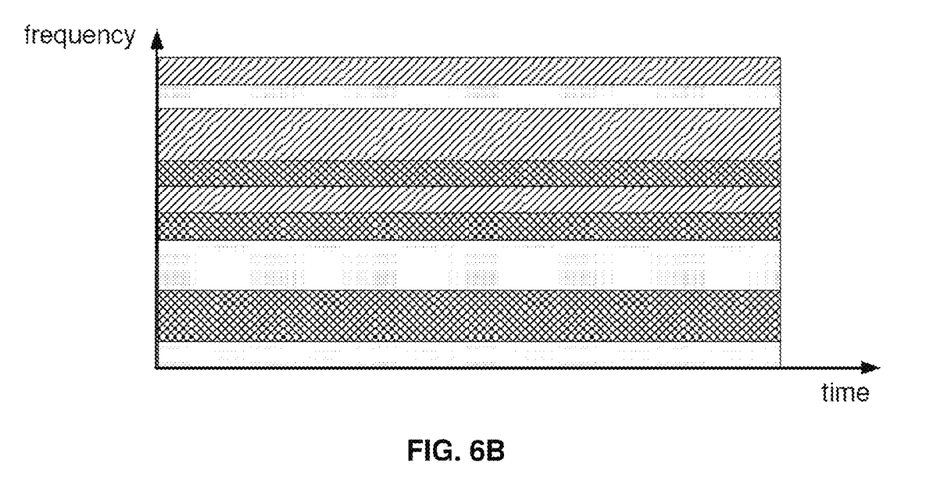
FIG. 6B—demonstrates designating frequency subchannels composed of possibly noncontiguous frequency subbands as the transmission resources.
Figure 6C:
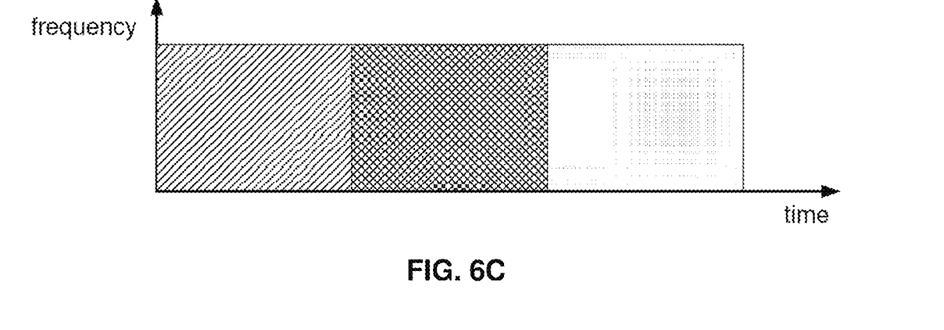
FIG. 6C—demonstrates partitioning time frame into time slots and designating the time slots as the transmission resources.

The transmission resources usually discussed in cellular communications are frequency channels. However, the division of the time-frequency plane into non-overlapping resources can happen in various ways, as illustrated in FIGS. 6A to 6D. FIG. 6A presents the regular way of defining frequency channels as resources. FIG. 6B shows an alternate way of dividing the frequency resource in noncontiguous way. This way of partitioning frequency into resources is useful, for example, in OFDMA systems such as those described by the IEEE 802.16 Recommendation (also known as WiMAX), in which subcarriers of OFDMA are divided into subchannels and groups of subchannels can be assigned, for example, to sectors as resources. Third way of dividing the resources in the time domain is illustrated in FIG. 6C. The time is divided into slices, and groups of time slices are designates as a resource. For example, in a frame based communication system each third frame may be assigned to a sector as a resource. Alternately, each frame may be partitioned into subframes and a given subframe within each frame may be assigned as a resource.

The frequency and/or timeslot assignments as transmission resources may be static or time-varying, such as with frequency hopping.

Additional domains of division into resources may be used, such as codes within a CDMA system or polarization.

Multibeam Antenna Technology

The present invention calls for multiple narrow beams in each base station. Narrow-beam antennas have large size, and using many of those would create unacceptable cumbersome and obtrusive solution. Fortunately, antennas which generate multiple beams from a common aperture are a well developed art. Planar arrays with a beamforming network (such as Butler matrix or Rotman lens) are capable of generating multiple beams in a 90-120 degree segment. Circular arrays, covering full circle, are another option—examples are Luneberg lens based antennas or an array of elements fed by a circular lens.

Digital beamforming is another option of generating steerable beams or multiple beams in parallel. In particular, when applied to multicarrier system, different set of beam-defining weights can be used for each carrier.

Many variants of multibeam antenna technology are capable of supporting dual polarization. This capability may be conveniently used for MIMO and diversity, as is often done with regular cellular communications.

Application to Switched Beam and Beamformed Antennas

Using large number of beams translates into large number of radio modems within each base station, and consequently become, in some instances, a limiting factor. Multibeam antennas may be combined with division of resources in the time domain in order to save on the amount of radio modems. These methods are illustrated in FIGS. 7A to 7C.

Figure 7A:
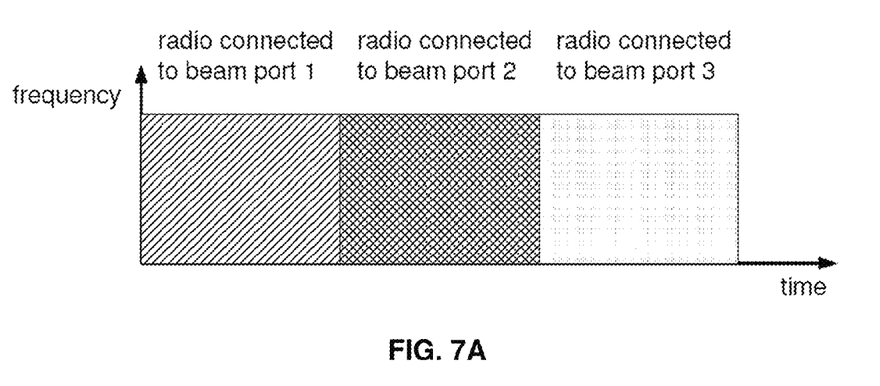
FIG. 7A—demonstrates the operation of radio modem in conjunction with switched-beam antenna to serve multiple beams alternately in time.

In one embodiment of the present invention, illustrated in FIG. 7A, the modem is augmented by an RF switch which allows directing the radio modem to one of several antenna ports, each associated with a beam. By alternately changing the switch position at the beginning of each timeslot, a resource is associated with an appropriate beam, thus we can cover the deployment with amount of radio modems which is reduced by a factor equal to the number of resources. For example, in the 9-sector case, we can partition the resource assignment ABCBCACAB into three groups (ABC)(BCA)(CAB) and serve each group with a single modem that alternates over three beams, one at each timeslot. Same effect may be achieved by a phased array antenna when new phasing command is issued to the antenna at the beginning of each time slot.

Figure 7B:
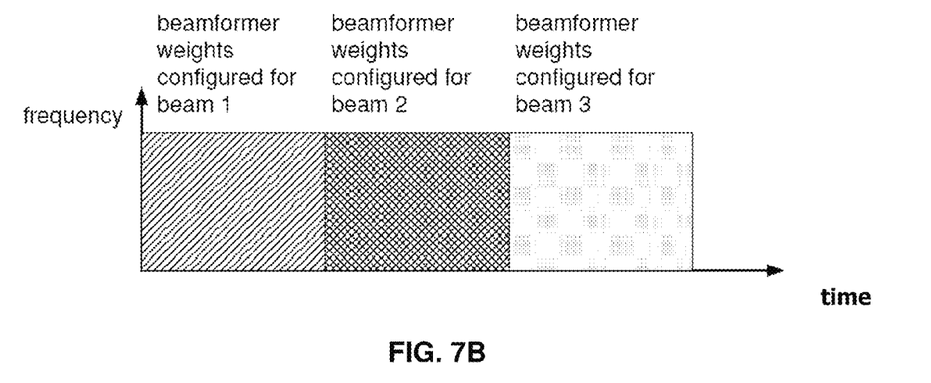
FIG. 7B—demonstrates the operation of digitally beamforming radio modem in conjunction with multi-element antenna to serve multiple beams alternately in time.
Figure 7C:
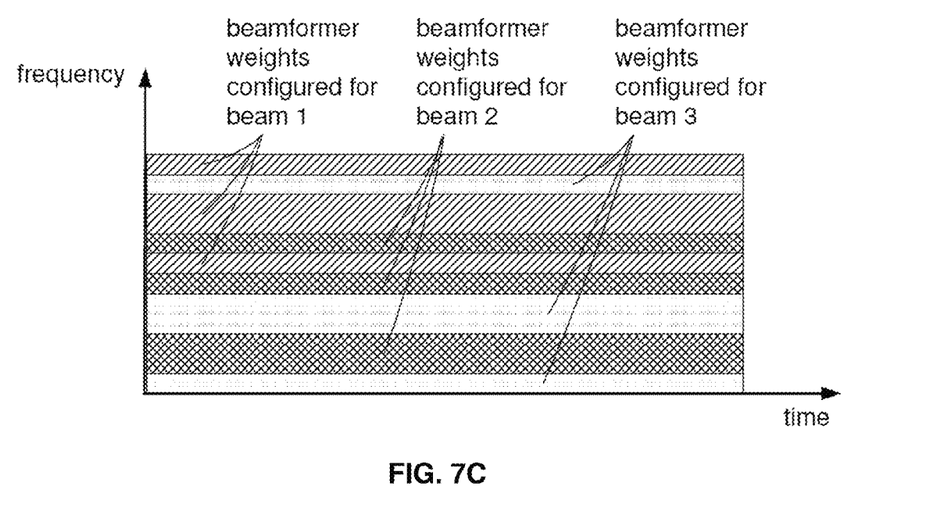
FIG. 7C—demonstrates the operation of digitally beamforming radio modem in conjunction with multi-element antenna to serve multiple beams in parallel by assigning a different set of weights to each frequency subchannel.

Additional embodiment of the present invention illustrated in FIG. 7B, is, to form the beams by applying weights digitally to the signal transmitted from multiple elements of a multielement antenna array. In this case, the weights need to be reconfigured at the beginning of each timeslot. Digital beamforming allows individual beamforming in the case of multiple resources transmitted in parallel. Such case is illustrated in FIG. 7C in which resources that are defined as groups of subchannels in frequency domain are transmitted simultaneously through three beams by applying a different set of beamforming weights to each subchannel group.

The use of multiple beams transmitted from an array covering several beams (3 in our example) creates a logical link to systems with small amount of smart-antenna sectors, where each sector is capable of generating several directional beams. By coordinating the beam schedule or subchannel assignment to beams, interference between opposing sectors can be significantly reduced. For example the 9-sector deployment used in the example above can be described as a 3-sector deployment with each sector capable of supporting 3 beams, either in parallel or sequentially in time.

Application to Uplink Scheduling

The interference management technique described above is also applicable to uplink reception with multielement antennas used with regular cellular deployments. Maximum Ratio Combining ("MRC") of signals received in the antenna elements are of a common practice today. When MRC is applied to antenna elements receiving a signal from a specific user, a receive beam shape is created. By clustering users into groups according to their beam shape as defined by the receive coefficients and defining an azimuth with respect to the base station, we can create a policy of serving each user with a specific resource. By applying such a policy to all sectors in all base stations, and planning the resource assignment according to the method provided by the present invention, the interference among base stations is reduced. To demonstrate the idea let us consider the 9-sector deployment of FIG. 3b. Let us assume that three sectors are present in each cell, covering azimuth ranges of 0-120, 120-240 and 240-360 degrees. By dividing the users within each sector into three groups according to the azimuth subrange ("beam") to which they belong, and by assigning each group a resource (e.g. a range of OFDMA subchannels in a IEEE 802.16 compatible system) we obtain the result that when users are scheduled on the same resource in opposing sectors they are angularly remote from each other and their mutual interference is substantially reduced.

The benefit of reduced interference on the uplink can readily translate into a benefit on the downlink. Transmit coefficients for forming a beam towards a user are readily obtained from the coefficients obtained during the MRC reception on the uplink. By applying the resource assignment approach to the beams generated during downlink beamforming, the interference management principles outlined above apply to downlink transmissions as well as during uplink transmissions.

Application to Given Base Station Locations

The design procedure for controlling interference among sectors in multisector base stations was exemplified above in a synthetic case where the system operator has the freedom to locate the base stations on a hexagonal grid. In real life scenarios, the base stations' locations are usually offset from such ideal grid due to real-life constrains. The procedure described above is still applicable to such a case by starting with an array of auxiliary cells which is distorted to match the actual base stations' locations, while the rest of the procedure is the same as described above.

System Performance

The performance of cellular communication systems, constructed in accordance with the above described examples, was analyzed while using a MATLAB package constructed for that purpose. The simulation takes into account antenna shapes, distances and propagation laws to evaluate the carrier-to-interference for each location in a deployment area. The C/I is then translated into a modulation level supported by each user (many modern communication systems, such as those that are compatible with the IEEE 802.16 Recommendation, support modulations varying over a wide range from BPSK to 64QAM). For simplicity, Shannon-capacity-type equation was used to convert C/I to data rate. The throughput is then averaged over the deployment area. The average throughput depends on the fairness criterion—whether each user gets the same data rate or whether each user gets the same fraction of airtime. Generally, the equal-data scheduling policy results in A lower throughput than if equal-time policy is applied.

Exemplary simulation results are shown in tables 1 and 2 for 3, 9 and 15 sector cases. While the average data rate per sector reduces slightly as the number of sectors increases due to slight increase in aggregate interference, generally the aggregate base station throughput is increased by a factor that is nearly proportional to the number of beams used. This shows that with the interference control method of the present invention, most of the throughput benefit in having multi-beam deployment, is obtained.

TABLE 1

Equal-time system throughput (b/sec/Hz)

| Number of sectors | Beam throughput (equal time) | BS throughput (equal time) | BS Spectral Efficiency (equal time) |
|---|---|---|---|
| 3 | 2.65 | 7.95 | 2.65 |
| 9 | 2.31 | 20.80 | 6.93 |
| 15 | 1.90 | 28.44 | 9.48 |

TABLE 2

Equal-time system throughput (b/sec/Hz)

| Number of sectors | Beam throughput (equal data) | BS throughput (equal data) | BS Spectral Efficiency (equal data) |
|---|---|---|---|
| 3 | 1.87 | 5.60 | 1.87 |
| 9 | 1.76 | 15.90 | 5.30 |
| 15 | 1.48 | 22.25 | 7.42 |

As will be appreciated by those skilled in the art, the examples provided herein illustrate the use of the method and system proposed by the present invention. However, similar processes may be applied in a similar way for determining the configuration of the network in order to increase the capacity of the base stations included in that network, all without departing from the scope of the present invention.

The invention claimed is:

1. A method for allocating resources in a wireless communications network, the method comprising:
   (a) dividing an area covered by the wireless communication network into a plurality of auxiliary cells;
   (b) assigning a resource to each of the plurality of auxiliary cells by using a first reuse scheme;
   (c) grouping some of the plurality of auxiliary cells into a first cluster of auxiliary cells associated with a first base station,
   wherein the first cluster of auxiliary cells is a first communication cell,
   wherein the first cluster of auxiliary cells includes at least one internal auxiliary cell and at least six edge auxiliary cells;
   (d) locating the first base station substantially at the center of the first communication cell; and
   (e) directing beams from the first base station towards the center of each edge auxiliary cell of the first cluster, but not to the at least one internal auxiliary cell,
   wherein:
   the first reuse scheme is a reuse-4 scheme;
   the first cluster consists of seven auxiliary cells;
   the seven auxiliary cells include the internal auxiliary cell and six edge auxiliary cells;
   the first base station is located in the internal auxiliary cell; and
   the beams comprise six beams, and each of the six beams is directed towards the center of a respective one of the six edge auxiliary cells.

2. The method according to claim 1, wherein the step of dividing the area comprises dividing the area covered by said wireless communications network into a plurality of auxiliary cells each having a substantially hexagonal shape.

3. The method according to claim 1, wherein dividing the area comprises dividing the area covered by said wireless communications network into a plurality of auxiliary cells, each auxiliary cell having a substantially rectangular shape.

4. The method according to claim 1, wherein each designated radio beam is different from any angularly adjacent designated radio beam-generated by a respective one of the at least one base station.

5. The method according to claim 1, wherein at least one of the designated radio beams is directed in a direction offset from all the straight lines connecting the base station to an adjacent base station.

6. The method according to claim 1, wherein the predefined reuse scheme comprises a reuse-3 or reuse-4 scheme and wherein allocating the at least one transmission resource to each designated radio beam is performed such that areas located at a boundary between communication cells are never assigned the same transmission resources.

7. The method according to claim 1, wherein dividing the plurality of auxiliary cells into groups is performed such that different communication cells have different resource assignments to the underlying auxiliary cells of the communication cell.

8. The method according to claim 1, wherein dividing the plurality of auxiliary cells into groups is performed such that all the communication cells have a same resource assignment to the underlying auxiliary cells of the communication cell.

9. The method according to claim 1, wherein the designated radio beams of at least one communication cell are not equally spaced.

10. The method according to claim 1, wherein the at least one interior auxiliary cell comprises at least three interior auxiliary cells.

11. The method of claim 1, wherein:
    the first reuse scheme is a reuse-3 scheme;
    the first cluster comprises seven auxiliary cells;
    the seven auxiliary cells include the internal auxiliary cell and six edge auxiliary cells;
    the first base station is located in the internal auxiliary cell; and
    the beams comprise six beams, and each of the six beams is directed towards the center of a respective one of the six edge auxiliary cells.

12. The method of claim 11, wherein the six beams are allocated using only two or three resources, and are allocated in an alternating fashion such that none of the beams is radially adjacent to a beam with an identical resource.

13. The method of claim 11, wherein each of the six beams is allocated with a resource associated with the edge auxiliary cell towards which each beam is directed.

14. The method of claim 1, wherein:
    the first reuse scheme is a reuse-3 scheme;
    the first cluster comprises twelve auxiliary cells;
    the twelve auxiliary cells include three internal auxiliary cells and nine edge auxiliary cells;
    the first base station is located substantially at a junction of the three internal auxiliary cells; and
    the beams comprise nine beams, and each of the nine beams is directed towards the center of a respective one of the nine edge auxiliary cells.

15. The method of claim 14, wherein each of the nine beams is allocated with a resource associated with the edge auxiliary cell towards which each beam is directed.

16. The method of claim 1, wherein:
    the first reuse scheme is a reuse-4 scheme;
    the first cluster comprises 61 auxiliary cells;
    the 61 auxiliary cells include 37 internal auxiliary cells and 24 edge auxiliary cells;
    the first base station is located near the center of the first cluster; and
    the beams comprise 24 beams, and each of the 24 beams is directed towards the center of a respective one of the 24 edge auxiliary cells.

17. The method of claim 16, wherein each of the 24 beams is allocated with a resource associated with the edge auxiliary cell towards which each beam is directed.

18. The method of claim 1, wherein the assigned resources are a member of the group consisting of: a) a frequency channel, b) a set of frequency channels, c) a set of frequency subchannels, d) a time slot, e) a set of time slots, and f) any time-frequency slot combination.

19. The method of claim 1, wherein the beams are directed by a member of the group consisting of: a) an antenna; b) a multibeam antenna; c) a multielement phased array antenna; and d) a digital beamforming antenna.

20. The method of claim 1, wherein the assigned resources are timeslots, and wherein said wireless communications network comprises at least one radio modem capable of serving more than one beam by way of alternating in time.

21. The method of claim 1, wherein each of the six beams is allocated with a resource associated with the edge auxiliary cell towards which each beam is directed.

* * * * *